(No Model.)
F. HARBERS.
JOINTED OAR.
No. 535,584. Patented Mar. 12, 1895.
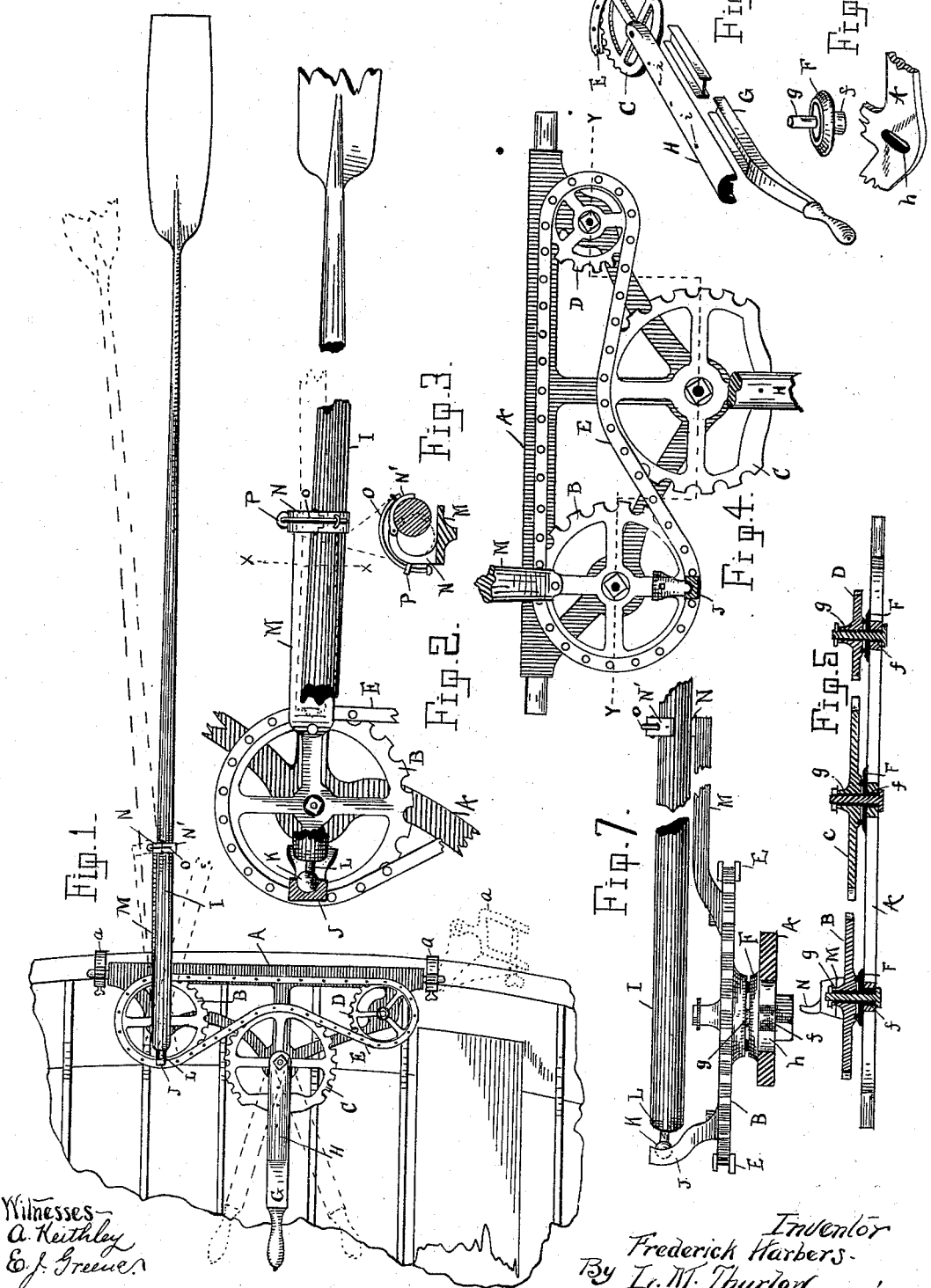
Witnesses
A. Keithley
E. J. Greene
Inventor
Frederick Harbers.
By L. M. Thurlow
Atty.

UNITED STATES PATENT OFFICE.

FREDERICK HARBERS, OF PEORIA, ILLINOIS.

JOINTED OAR.

SPECIFICATION forming part of Letters Patent No. 535,584, dated March 12, 1895.

Application filed August 16, 1894. Serial No. 520,456. (No model.)

*To all whom it may concern:*

Be it known that I, FREDERICK HARBERS, a citizen of the United States, residing at Peoria, in the county of Peoria and State of Illinois, have invented certain new and useful Improvements in Jointed Oars; and I do hereby declare that the following is a full, clear, and exact description of the invention, which will enable others skilled in the art to which it appertains to make and use the same.

This invention relates to improvements in oars.

The object of the invention is to provide a front facing oar for boats which will feather automatically by a simple arrangement to be described.

In the drawings appended, Figure 1 represents a plan view of the oar and its mechanism placed in a boat in working position. Fig. 2 is a plan view of a portion of the oar mechanism and showing the two positions of the oar. Fig. 3 is a cross section of the oar through line $x\ x$ Fig. 2. Fig. 4 is a plan view of the oar mechanism. Fig. 5 is a cross sectional elevation of the mechanism through line $y\ y$, Fig. 4. Fig. 6 is a perspective view of a handle showing its parts and means of attachment to the oar mechanism. Fig. 7 is a sectional elevation of a sprocket wheel showing means of mounting the oar thereon. Fig. 8 is a perspective view of a portion of the supporting frame and an adjustable bearing plate.

A represents a frame which is pivoted in the clamps $a\ a$ on the gunwale of a boat and on which are mounted substantially in the positions shown, three sprocket wheels B, C and D. The wheel C is the larger of the three and occupies the position between the two wheels B and D and a sprocket chain E passes around the wheels B and D and also engages the said wheel C. All three of the wheels are mounted on the frame A substantially in the manner here described. Upon the said frame A at the point where each of the wheels is to be secured, is a plate F having a lower boss $f$ which passes through a hole in the said frame and serves to retain the plate in place. A boss or projection $g$ is also made with the upper side of the said plate F and over this the sprocket wheel is set and a bolt passes through the entire device thus formed, which holds the parts securely in place. Both the plate F and the sprocket wheels are provided with an annular groove or track wherein a series of balls are retained thus making a good smooth and freely working bearing.

The center wheel C is made adjustable for taking up slack in the chain by enlarging the hole for the boss $f$ into a slot $h$ by which means the plate F and the parts may be shifted to any desired position.

A metal handle G is bolted to a wooden arm H secured to the wheel C and by means of the holes $i$ the handle is adjustable for length. The oar I is mounted on the wheel B parallel with the handle by the use of a post J secured to the said wheel and having a socket formed in its upper extremity for the reception of a ball K on the end of a rod L inserted in the end of the oar, and a projecting arm M secured at one end to the said wheel B carrying a hinge N to which the oar is secured. The swinging portion of the hinge is shown by N' whose free end is secured to the oar in any desired manner. A spring O is secured at one end to the hinge portion N' and the opposite extremity thereof passes through a hole in a lug P of the hinge N as shown in Fig. 3. The normal position of the portion N' due to the tension of the spring O is as shown in the said Fig. 3.

By moving the handle G, and consequently the wheel C, in one direction the wheel B will be moved in an opposite direction thus carrying the oar in the same direction of movement as the handle.

In Fig. 1 the oar is shown in its normal position or its position of rest, *i. e.* with the blade occupying a horizontal position and this position of the blade is due to the said spring O of the hinge N which keeps the hinge open and the oar raised in consequence If the spring were not used the oar would drop down and occupy a position within the hinge as shown by dotted lines in Fig. 3 and in that position the oar blade would be vertical.

In operation the blade is constantly changing from the horizontal to the vertical position and vice versa. When the handle G is moved forward, the oar moves forward also and as the oar is dipped and the motion reversed, the tension of the spring O is overcome and the oar swings down into the hinge as shown by dotted lines in Fig. 3 and the blade becomes vertical and ready to draw water. As the stroke is ended and the oar is lifted from the water for another stroke, the spring O swings the oar upward again in the horizontal position or the position of feathering.

By the use of the ball and socket joint, the oar is free to move in any direction required in the attainment of the object for which the device was designed.

The spring O is sufficiently strong to swing the oar easily to the horizontal position but not so strong but what the oar is easily swung down to the vertical position again when a stroke is taken. This operation may perhaps be better understood when it is seen that the oar is hung from above and in consequence of the weight of the water which the oar encounters in the stroke it must be carried downward to the vertical position. It may also be stated in this connection, that the mere swinging of the oar in the air will carry the oar from the horizontal to the vertical position when the imaginary stroke is taken because of the reversing of the motion of swing and the momentum and weight of the oar.

Having thus described my invention, what I claim as new, and desire to secure by Letters Patent, is—

1. In a jointed oar, a frame pivotally mounted on a boat and carrying a series of sprocket wheels, a chain running on said wheels, a handle mounted on one of said wheels, an oar mounted on one of the other of the said series of wheels, motion being imparted to the oar by the handle and the wheel on which it is mounted and the sprocket chain substantially as and for the purposes set forth and described.

2. In a jointed oar for boats a supporting frame suitably mounted on the boat, a swinging pivotal support on said frame, an oar handle mounted on said pivotal support by suitable means and capable of a swinging horizontal movement in either direction, an oar also mounted on the said pivotal support by a suitable swinging support and capable of a swinging horizontal movement in either direction, said oar being also capable of a partial revoluble movement on said swinging support by means of a pivotal connection of the extremity and the loom of said oar with said swinging support and means for raising the oar blade to a horizontal position and consisting of a spring forming connection with the oar and the pivotal support and a hinged joint to support the loom to allow a free movement of the oar substantially as herein set forth and for the purpose described.

3. In a jointed oar, a frame pivotally mounted on a boat, a series of wheels mounted on said frame, a chain passing around said wheels, a handle secured to one of the said wheels, substantially as shown, and imparting movement to the series of wheels, an oar mounted on one of the other of the series of wheels and adapted to have a free pivotal movement thereon, and means for imparting a semi-revoluble movement to the oar for the purposes set forth and described.

4. In a jointed oar for boats, an oar mounted on a suitable frame or support independent of the oar handle and so mounted as to allow the oar to have a semi-revoluble movement on said support whereby the oar blade is thrown from a horizontal to a vertical position by the momentum of the oar at the moment of reversing of the direction of the movement, and means for raising said oar from the vertical position to the horizontal for the purposes set forth and described.

5. In a jointed oar for boats, an oar mounted on a suitable support and having an indirect connection with the oar handle, for the purposes set forth, the shank of said oar being hung from a hinge on said support, a spring mounted on the said hinge for raising the oar, and a ball and socket joint forming a pivotal connection between the oar and the said support, substantially in the manner and for the purposes set forth.

In testimony whereof I affix my signature in presence of two witnesses.

FREDERICK HARBERS.

Witnesses:
A. KEITHLEY,
GEO. F. ROOKE.